(12) United States Patent
Minami et al.

(10) Patent No.: US 11,319,406 B2
(45) Date of Patent: May 3, 2022

(54) PREPREG, FIBER-REINFORCED COMPOSITE MATERIAL, AND MOLDED ARTICLE

(71) Applicant: ENEOS Corporation, Tokyo (JP)

(72) Inventors: Masaki Minami, Tokyo (JP); Takayuki Matsumoto, Tokyo (JP); Ayumu Komata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/758,289

(22) PCT Filed: Nov. 13, 2018

(86) PCT No.: PCT/JP2018/042008
§ 371 (c)(1),
(2) Date: Apr. 22, 2020

(87) PCT Pub. No.: WO2019/098201
PCT Pub. Date: May 23, 2019

(65) Prior Publication Data
US 2020/0339739 A1    Oct. 29, 2020

(30) Foreign Application Priority Data

Nov. 14, 2017    (JP) .............................. JP2017-219064

(51) Int. Cl.
| | | |
|---|---|---|
| C08J 5/04 | (2006.01) | |
| C08J 5/24 | (2006.01) | |
| C08L 63/00 | (2006.01) | |
| C08K 5/3492 | (2006.01) | |
| B32B 5/26 | (2006.01) | |
| B32B 27/04 | (2006.01) | |
| B32B 27/18 | (2006.01) | |
| B32B 27/26 | (2006.01) | |
| B32B 27/38 | (2006.01) | |
| C08G 59/50 | (2006.01) | |
| C08K 5/00 | (2006.01) | |
| B32B 5/02 | (2006.01) | |
| C08G 59/24 | (2006.01) | |

(52) U.S. Cl.
CPC .............. *C08G 59/504* (2013.01); *B32B 5/26* (2013.01); *B32B 27/04* (2013.01); *B32B 27/18* (2013.01); *B32B 27/26* (2013.01); *B32B 27/38* (2013.01); *C08J 5/042* (2013.01); *C08J 5/24* (2013.01); *C08K 5/0066* (2013.01); *C08K 5/34922* (2013.01); *C08K 5/34924* (2013.01); *C08L 63/00* (2013.01); *B32B 5/02* (2013.01); *B32B 2250/20* (2013.01); *B32B 2260/021* (2013.01); *B32B 2260/046* (2013.01); *B32B 2262/106* (2013.01); *B32B 2305/076* (2013.01); *B32B 2305/72* (2013.01); *B32B 2307/3065* (2013.01); *B32B 2363/00* (2013.01); *B32B 2457/00* (2013.01); *C08G 59/245* (2013.01); *C08G 59/5086* (2013.01); *C08J 2363/00* (2013.01); *Y10S 428/902* (2013.01); *Y10S 428/921* (2013.01); *Y10T 428/31511* (2015.04)

(58) Field of Classification Search
None
See application file for complete search history.

(56) References Cited

U.S. PATENT DOCUMENTS

| | | | | |
|---|---|---|---|---|
| 5,037,869 A | * | 8/1991 | Sprenkle, Jr. ............ | C08K 5/12 524/100 |
| 6,242,110 B1 | * | 6/2001 | Iwasaki ................. | H01L 23/293 428/620 |
| 6,440,567 B1 | * | 8/2002 | Choate .................... | C08K 3/02 428/418 |
| 6,620,510 B1 | * | 9/2003 | Taguchi .................... | C08J 5/24 428/297.4 |
| 7,687,722 B2 | | 3/2010 | Japp et al. | |
| 2004/0077771 A1 | * | 4/2004 | Wadahara ................ | C08J 5/005 524/495 |
| 2004/0166325 A1 | * | 8/2004 | Gallo ................. | C08G 59/3218 428/413 |
| 2005/0209378 A1 | * | 9/2005 | Ahsan ................ | C08K 5/34928 524/100 |
| 2007/0111010 A1 | * | 5/2007 | Kaprinidis .............. | C08L 63/00 428/413 |
| 2008/0078570 A1 | * | 4/2008 | Japp .................. | H01L 23/49833 174/256 |
| 2008/0166511 A1 | * | 7/2008 | Honma ..................... | C08K 3/02 428/36.4 |
| 2009/0069490 A1 | * | 3/2009 | Ogura .................. | C08G 59/621 524/540 |
| 2009/0111924 A1 | * | 4/2009 | Ito .......................... | C08G 59/56 524/384 |
| 2009/0264562 A1 | * | 10/2009 | Schellekens ............. | C08K 7/14 524/101 |

(Continued)

FOREIGN PATENT DOCUMENTS

| | | | |
|---|---|---|---|
| CN | 101381506 A | * | 3/2009 |
| CN | 101597421 A | * | 12/2009 |

(Continued)

OTHER PUBLICATIONS

Machine Translation of EP-0365784-A2, May 1990 (Year: 1990).*
Machine Translation of JP-11035795-A, Feb. 1999 (Year: 1999).*
Machine Translation of CN-101381506-A, Mar. 2009 (Year: 2009).*
Machine Translation of CN-102276961-A, Dec. 2011 (Year: 2011).*
4PCB, Prepreg Thickness chart, May 2018 (Year: 2018).*
Machine Translation of JP-2006291094-A, Oct. 2006 (Year: 2006).*
Machine Translation of JP-5733679-B2, Jun. 2015 (Year: 2015).*

(Continued)

*Primary Examiner* — Jeffrey A Vonch
(74) *Attorney, Agent, or Firm* — Greenblum & Bernstein, P.L.C.

(57) ABSTRACT

A prepreg comprising: carbon fibers; and a resin composition containing an epoxy resin having a biphenyl structure, a curing agent, and melamine cyanurate.

7 Claims, No Drawings

(56) References Cited

U.S. PATENT DOCUMENTS

| | | | | |
|---|---|---|---|---|
| 2010/0179353 A1* | 7/2010 | Nakanishi | ............ | C08G 59/063 |
| | | | | 568/671 |
| 2010/0233486 A1* | 9/2010 | Inoue | ................ | C08K 5/5399 |
| | | | | 428/417 |
| 2011/0184091 A1* | 7/2011 | Mizuki | ............ | C08G 59/4238 |
| | | | | 523/428 |
| 2011/0194261 A1* | 8/2011 | Tanaka | .................. | B32B 17/04 |
| | | | | 361/748 |
| 2011/0259628 A1* | 10/2011 | Satou | ..................... | C08G 59/08 |
| | | | | 174/257 |
| 2011/0319525 A1* | 12/2011 | Maeda | ..................... | C08J 5/042 |
| | | | | 523/452 |
| 2012/0095132 A1* | 4/2012 | Chang | ................ | C08G 59/1477 |
| | | | | 523/429 |
| 2012/0164373 A1* | 6/2012 | Spencer | ............. | C08G 59/4021 |
| | | | | 428/116 |
| 2012/0315814 A1* | 12/2012 | Fung | ..................... | C08L 71/123 |
| | | | | 442/117 |
| 2013/0089743 A1* | 4/2013 | Ogashiwa | .......... | C08G 59/4042 |
| | | | | 428/418 |
| 2013/0161080 A1* | 6/2013 | Lin | ..................... | C08G 59/4284 |
| | | | | 174/257 |
| 2013/0172459 A1* | 7/2013 | Tsuchikawa | ....... | C08G 73/0655 |
| | | | | 524/188 |
| 2013/0217287 A1* | 8/2013 | Cho | ........................ | B32B 15/14 |
| | | | | 442/186 |
| 2013/0341121 A1* | 12/2013 | Kim | ....................... | D04H 1/587 |
| | | | | 181/294 |
| 2014/0023839 A1* | 1/2014 | Wang | ......................... | C08J 5/24 |
| | | | | 428/209 |
| 2014/0227531 A1* | 8/2014 | Ogashiwa | ................ | B32B 5/024 |
| | | | | 428/418 |
| 2015/0017449 A1* | 1/2015 | Itoh | ........................ | C08L 63/04 |
| | | | | 428/416 |
| 2015/0257257 A1* | 9/2015 | Satou | ..................... | C08G 59/686 |
| | | | | 428/418 |
| 2016/0260645 A1* | 9/2016 | Ogawa | ..................... | C08K 3/36 |
| 2016/0300561 A1* | 10/2016 | Kim | ......................... | B32B 7/12 |
| 2017/0158807 A1* | 6/2017 | Yoshimoto | ......... | C08G 59/3218 |
| 2017/0158854 A1* | 6/2017 | Ueno | ..................... | C08L 71/126 |
| 2017/0198135 A1* | 7/2017 | Li | ........................... | C08G 59/58 |
| 2017/0283609 A1* | 10/2017 | Zeng | ........................ | C08J 5/043 |
| 2017/0313043 A1* | 11/2017 | Fujimura | ............... | C08G 59/62 |
| 2018/0327558 A1* | 11/2018 | Li | ............................. | B32B 15/08 |

FOREIGN PATENT DOCUMENTS

| | | | | |
|---|---|---|---|---|
| CN | 101851480 A | * | 10/2010 | |
| CN | 102276959 A | * | 12/2011 | ............. B29C 48/92 |
| CN | 102276961 A | * | 12/2011 | |
| CN | 102504532 A | * | 6/2012 | |
| CN | 102875968 A | * | 1/2013 | |
| CN | 104610704 A | * | 5/2015 | |
| CN | 106977879 A | * | 7/2017 | |
| EP | 0365784 A2 | * | 5/1990 | ............... C08K 5/00 |
| JP | 07331033 A | * | 12/1995 | |
| JP | 08301982 A | * | 11/1996 | |
| JP | 11035795 A | * | 2/1999 | |
| JP | 11209569 A | * | 8/1999 | |
| JP | 2001302823 A | * | 10/2001 | |
| JP | 2001342358 A | * | 12/2001 | |
| JP | 2002003702 A | * | 1/2002 | |
| JP | 2003238657 A | * | 8/2003 | |
| JP | 2004244584 A | * | 9/2004 | |
| JP | 2006124434 A | * | 5/2006 | |
| JP | 2006265458 A | * | 10/2006 | |
| JP | 2006291094 A | * | 10/2006 | |
| JP | 2007291227 A | * | 11/2007 | |
| JP | 2008-091919 | | 4/2008 | |
| JP | 2009-164582 | | 7/2009 | |
| JP | 2010126702 A | * | 6/2010 | |
| JP | 2010-275374 | | 12/2010 | |
| JP | 2010-275375 | | 12/2010 | |
| JP | 2010275374 A | * | 12/2010 | |
| JP | 2010275375 A | * | 12/2010 | |
| JP | 2011-178992 | | 9/2011 | |
| JP | 2013-170344 | | 9/2013 | |
| JP | 2013-185156 | | 9/2013 | |
| JP | 2013194060 A | * | 9/2013 | |
| JP | 5733679 B2 | * | 6/2015 | ............ C09J 163/04 |
| JP | 2016084413 A | * | 5/2016 | |
| JP | 2016-536403 | | 11/2016 | |
| KR | 20080045824 A | * | 5/2008 | |
| TW | 201127898 A | * | 8/2011 | |
| WO | WO-03082976 A1 | * | 10/2003 | ........... C08G 59/688 |
| WO | 2005/082982 | | 9/2005 | |
| WO | WO-2007112995 A1 | * | 10/2007 | ............... C08K 7/14 |
| WO | 2015/149449 | | 10/2015 | |
| WO | WO-2015154315 A1 | * | 10/2015 | ............. B32B 27/04 |

OTHER PUBLICATIONS

International Preliminary Report on Patentability, WIPO, Application No. PCT/JP2018/042008, dated May 19, 2020, English translation.

ISR issued in International Search Authority, Application No. PCT/JP2018/042008 dated Feb. 12, 2019, English translation.

* cited by examiner

PREPREG, FIBER-REINFORCED COMPOSITE MATERIAL, AND MOLDED ARTICLE

TECHNICAL FIELD

The present invention relates to a prepreg, a fiber-reinforced composite material, and a molded article.

BACKGROUND ART

A fiber-reinforced composite material consisting of carbon fibers and a matrix resin is lightweight and has excellent strength, and hence is used in various applications.

Such a fiber-reinforced composite material may be required to have flame retardancy, and conventionally, a method of making the fiber-reinforced composite material flame retardant by including a halogenated flame retardant or a phosphorus-based flame retardant is known. For example, Patent Literature 1 describes a method of obtaining a fiber-reinforced composite material having excellent flame retardancy by blending a phosphorus-containing compound with an epoxy resin composition for firming a matrix resin.

CITATION LIST

Patent Literature

Patent Literature 1: International Publication No.

SUMMARY OF INVENTION

Technical Problem

However, when the halogenated flame retardant and phosphorus-based flame retardant are used, there are problems such as generation of toxic gas during combustion and environmental load during disposal.

In recent years, the use of the fiber-reinforced composite material for housings of electrical and electronic equipment has been investigated, and a thin fiber-reinforced composite material has been required from the viewpoint of thinning the housing and reducing the weight of the equipment. In the conventional method, it is difficult to provide a fiber-reinforced composite material that can secure sufficient flame retardancy even when the thickness is small and that contains no halogen and phosphorus.

Thus, an object of the present invention is to provide a prepreg capable of forming a fiber-reinforced composite material that achieves both thinness and flame retardancy without using the halogenated flame retardant and phosphorus-based flame retardant. Another object of the present invention is to provide a fiber-reinforced composite material formed using the above prepreg and a molded article comprising the same.

Solution to Problem

One aspect of the present invention relates to a prepreg comprising carbon fibers and a resin composition containing an epoxy resin having a biphenyl structure, a curing agent, and melamine cyanurate. According to such a prepreg, it is possible to form a fiber-reinforced composite material that achieves both thinness and flame retardancy without using the halogenated flame retardant and phosphorus-based flame retardant.

In one embodiment, the content of the above melamine cyanurate may be 20 to 40% by mass based on the total amount of the resin composition.

In one embodiment, the content of chlorine atom in the above resin composition may be 1% by mass or less.

In one embodiment, the content of phosphorus atom in the above resin composition may be 0.1% by mass or less.

Another aspect of the present invention relates to a fiber-reinforced composite material obtained by laminating and curing a plurality of prepregs, wherein at least one of the above prepregs is the above prepreg.

The fiber-reinforced composite material according to one aspect may have a thickness in the laminating direction of 1.5 mm or less.

The fiber-reinforced composite material according to one aspect may have a flame retardancy of V-0 or V-1 as evaluated by UL94 burning test.

Still another aspect of the present invention relates to a molded article comprising the above fiber-reinforced composite material.

Advantageous Effects of Invention

The present invention provides a prepreg capable of forming a fiber-reinforced composite material that achieves both thinness and flame retardancy without using a halogenated flame retardant and phosphorus-based flame retardant. The present invention also provides a fiber-reinforced composite material formed using the above prepreg and a molded article comprising the same.

DESCRIPTION OF EMBODIMENTS

Hereinafter, suitable embodiments of the present invention will be described.

(Prepreg)

The prepreg according to the present embodiment comprises carbon fibers and a resin composition containing an epoxy resin having a biphenyl structure, a curing agent, and melamine cyanurate. According to such a prepreg, it is possible to form a fiber-reinforced composite material that achieves both thinness and flame retardancy without using the halogenated flame retardant and phosphorus-based flame retardant.

The carbon fiber is not particularly limited, and the carbon fiber used for the fiber-reinforced composite material can be used without any particular limitation. The carbon fiber includes polyacrylonitrile (PAN)-based carbon fibers and pitch-based carbon fibers depending on the raw materials. The pitch-based carbon fiber has the property of high tensile elasticity, while the PAN-based carbon fiber has the property of high tensile strength. The carbon fiber in the present embodiment may be the PAN-based carbon fiber or pitch-based carbon fiber, and the pitch-based carbon fiber is more preferable from the viewpoint of obtaining a carbon fiber-reinforced composite material that is farther excellent in deformation resistance.

It is preferable that the prepreg according to the present embodiment comprise carbon fibers having a tensile elastic modulus of 150 GPa or more. The tensile elastic modulus of the carbon fiber is more preferable to be 200 GPa or more, further preferable to be 450 GPa or more, and furthermore preferable to be 600 GPa or more. When a plurality of types of the prepreg are used, it is preferable that most of the carbon fibers contained in the prepreg (for example, 70% by mass or more, preferably 80% by mass or more) have the above suitable tensile elastic modulus. In the present description, the tensile elastic modulus of the carbon fiber means the strand tensile elastic modulus measured by JIS R7601 (1986).

In the prepreg according to the present embodiment, the number of carbon fibers per unit area may be, for example, 30 g/m² or more, is preferably 50 g/m² or more, and is more preferably 70 g/m² or more. Such a number of carbon fibers can decrease the number of the lamination to obtain a predetermined thickness in molding a fiber-reinforced composite material and can simplify an operation. The number of carbon fibers per unit area may also be, for example, 3000 g/m² or less, is preferably 2000 g/m² or less, and is more preferably 1000 g/m² or less. Thereby, generation of a void is suppressed and a uniform fiber-reinforced composite material is easy to obtain.

The content of carbon fibers in the prepreg may be, for example, 20% by mass or more, is preferably 30% by mass or more, and is more preferably 40% by mass or more, based on the total amount of the prepreg. Thereby, the strength of the fiber-reinforced composite material is further improved. The content of carbon fibers in the prepreg may also be, for example, 90% by mass or less, is preferably 85% by mass or less, and is more preferably 80% by mass or less, based on the total amount of the prepreg. Thereby, generation of a void is suppressed and a uniform fiber-reinforced composite material is easy to obtain.

The resin composition contains an epoxy resin having a biphenyl structure, a curing agent, and melamine cyanurate. Curing the resin composition forms a matrix resin in the fiber-reinforced composite material.

The epoxy resin having a biphenyl structure (hereinafter sometimes referred to as "epoxy resin (A)") is a compound having a biphenyl structure and two or more epoxy groups.

The biphenyl structure is a structure in which two benzene rings are covalently bonded with a single bond. The biphenyl structure in the epoxy resin (A) may have a substituent on the benzene ring. Examples of the substituent include an alkyl group, an aryl group, an aralkyl group, a hydroxyl group, and an alkoxy group.

The epoxy equivalent of an epoxy resin (A) is not specifically limited, and may be, for example, 150 or more, is preferably 200 or more, and is more preferably 250 or more. The epoxy equivalent of the epoxy resin (A) may be, for example, 1000 or less, is preferably 700 or less, and is more preferably 400 or less.

Examples of the epoxy resin (A) include an epoxy resin represented by the following formula (A-1).

[Chemical Formula 1]

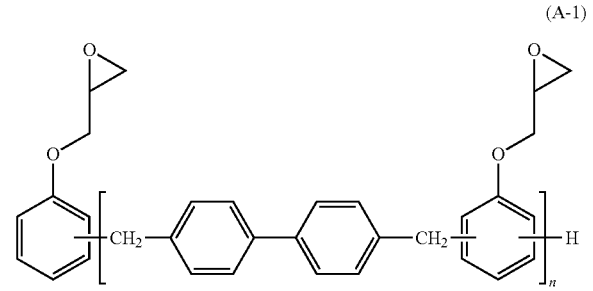

(A-1)

In the formula, n is an integer of 1 or more, preferably 1 to 30, and more preferably 1 to 10.

A commercially available product may be used as the epoxy resin (A), and for example, NC-3000, NC-3000H, and NC-3100 (trade name, manufactured by Nippon Kayaku Co., Ltd.) can be suitably used.

The content of the epoxy resin (A) in the resin composition may be, for example, 15% by mass or more, is preferably 20% by mass or more, and is more preferably 25% by mass or more, based on the total amount of the resin composition. Thereby, the heat resistance and toughness of the fiber-reinforced composite material are further improved. The content of the epoxy resin (A) may also be, for example, 45% by mass or less, is preferably 40% by mass or less, and is more preferably 35% by mass or less, based on the total amount of the resin composition. Thereby, the resin composition can be maintained at an appropriate viscosity, and the operation can be simplified.

The resin composition may further contain an epoxy resin other than the epoxy resin (A) (hereinafter sometimes referred to as "epoxy resin (B)"). The epoxy resin (B) can be a compound having two or more epoxy groups and having no biphenyl structure.

The epoxy resin (B) is any curable epoxy resin in the same manner as the epoxy resin (A), and is not particularly limited. The epoxy resin (B) may be added for the purpose of adjusting the viscosity of the resin composition and improving the curability of the composition.

Examples of the epoxy resin "B" include a bisphenol A epoxy resin, a bisphenol epoxy resin, a bisphenol S epoxy resin, a phenol novolac epoxy resin, a cresol novolac epoxy resin, a resorcinol epoxy resin, and an epoxy resin having a naphthalene skeleton.

The content of the epoxy resin (A) with respect to the total amount of the epoxy resin (A) and the epoxy resin (B) may be, for example, 20% by mass or more, is preferably 25% by mass or more, and is more preferably 30% by mass or more. Thereby, the heat resistance of the fiber-reinforced composite material is further improved.

The upper limit of the content of the epoxy resin (A) with respect to the total amount of the epoxy resin (A) and the epoxy resin (B) is not particularly limited, and may be, for example, 40% by mass or less, and may be 35% by mass or less.

The total amount of the epoxy resin (A) and the epoxy resin (B) may be, for example, 50% by mass or more, is preferably 55% by mass or more, and is more preferably 60% by mass or more, based on the total amount of the resin composition. Thereby, mechanical properties more suitable as a fiber-reinforced composite material are easily obtained. The total amount of the epoxy resin (A) and the epoxy resin (B) may be, for example, 80% by mass or less, is preferably 75% by mass or less, and is more preferably 70% by mass or less, based on the total amount of the resin composition. Thereby, additives such as other resins, curing agents, and curing accelerators can be sufficiently added as constituent materials of the resin composition, and improvement in various physical properties can be achievable.

The curing agent may be a curing agent that can cure the epoxy resin (A) (in some cases, the epoxy resin (A) and the epoxy resin (B)). Examples of the curing agent include amine curing agents, acid anhydride curing agents, and phenol curing agents, and among them, the amine curing agents are preferable, and among them, dicyandiamide and diaminodiphenylsulfone are more preferable.

The content of the curing agent is not particularly limited, and may be, for example, 0.1% by mass or more, is preferably 0.5% by mass or more, and is more preferably 1% by mass or more, based on the total amount of the resin composition. The content of the curing agent may also be, for example, 10% by mass or less, is preferably 8% by mass or less, and is more preferably 6% by mass or less, based on the total amount of the resin composition.

The content of melamine cyanurate may be, for example, 15% by mass or more, is preferably 20% by mass or more, and is more preferably 25% by mass or more, based on the total amount of the resin composition. Thereby, the heat resistance of the fiber-reinforced composite material is further improved. The content of melamine cyanurate may also be, for example, 50% by mass or less, is preferably 45% by mass or less, and is more preferably 40% by mass or less, based on the total amount of the resin composition. Thereby, the resin composition can be maintained at an appropriate viscosity, and workability is improved.

The ratio of the content $C_2$ of melamine cyanurate to the content $C_1$ of the epoxy resin (A), $(C_2/C_1)$ (mass ratio), may be, for example, 0.5 or more, is preferably 1.0 or more. The above ratio $(C_2/C_1)$ may also be, for example, 3.0 or less and is preferably 2.0 or less. Such a ratio $(C_2/C_1)$ tends to further improve the flame retardancy in the case where the thickness of the fiber-reinforced composite material is small.

The total amount of the content $C_1$ of the epoxy resin (A) and the content $C_2$ of melamine cyanurate, $(C_1+C_2)$, may be, for example, 30% by mass or more, is preferably 35% by mass or more, and is more preferably 40% by mass or more, based on the total amount of the resin composition. The total amount $(C_1+C_2)$ may also be, for example, 80% by mass or less, is preferably 75% by mass or less, and is more preferably 70% by mass or less, based on the total amount of the resin composition. Such a total amount $(C_1+C_2)$ tends to further improve the flame retardancy in the case where the thickness of the fiber-reinforced composite material is small.

The resin composition may further contain a curing accelerator. Examples of the curing accelerator used in combination with dicyandiamide include 3-phenyl-1,1-dimethylurea, 3-(4-chlorophenyl)-1,1-dimethylurea, and 3-(3,4-dichlorophenyl)-1,1-dimethylurea (DCMU), and among them, 3-(3,4-dichlorophenyl)-1,1-dimethylurea (DCMU) is preferable.

The content of the curing accelerator is not particularly limited, and may be, for example, 0.1% by mass or more, is preferably 0.5% by mass or more, and is more preferably 1% by mass or more, based on the total amount of the resin composition. The content of the curing accelerator may also be, for example, 10% by mass or less, is preferably 8% by mass or less, and is more preferably 6% by mass or less, based on the total amount of the resin composition.

The resin composition may further contain other components other than those described above. Examples of other components include inorganic fine particles and organic fine particles. Each content of such other components may be, for example, 50% by mass or less, is preferably 40% by mass or less, and is more preferably 30% by mass or less, based on the total amount of the resin composition. The content of the above other components may be, for example, 0% by mass or more, or 10% by mass or more.

For the resin composition, it is preferable for the viscosity at 50° C. to be 10 Pa·s or more and it is more preferable for that to be 50 Pa·s or more. Thereby, dripping of the resin composition is fully suppressed, and the manufacture of the prepreg tends to be easier. It is also preferable for the viscosity of the resin composition at 50° C. to be 20000 Pa·s or less and it is more preferable for that to be 10000 Pa·s or less. Thereby, the tack and drape properties of the resin composition become more suitable.

The content of chlorine atoms in the resin composition may be, for example, 1% by mass or less, is preferably 0.5% by mass or less, is more preferably 0.1% by mass or less, and may be equal to or below the detection limit. According to such a resin composition, generation of the chlorine containing gas during combustion can be suppressed while ensuring sufficient flame retardancy by the above configuration.

The content of phosphorus atoms in the resin composition may be, for example, 0,1% by mass or less, is preferably 0.01% by mass or less, is more preferably 0.001% by mass or less, and may be equal to or below the detection limit. The phosphorus-containing compound is often poor in compatibility with resins, and hence production of a homogeneous prepreg may be difficult. On the other hand, in the present embodiment, a homogeneous prepreg can be easily obtained while ensuring sufficient flame retardancy by the above configuration. In addition, the reduction in the content of the phosphorus atom can sufficiently ensure environmental safety.

For the resin composition, it is preferable for the glass transition temperature (Tg) after curing to be 120° C. or more and it is more preferable for that to be 150° C. or more. According to such a resin composition, the fiber-reinforced composite material having further excellent heat resistance can be obtained.

The manufacturing method of the prepreg according to the present embodiment is not specifically limited. For example, a prepreg can be manufactured by preparing a carbon fiber bundle in which carbon fibers are aligned in one direction and by impregnating the carbon fiber bundle with a resin composition. Examples of the method of impregnation with the resin composition include a wet method in which the resin composition is dissolved in a solvent to lower the viscosity and impregnation is performed, and a hot melt method (dry method) in which direct impregnation is performed with the resin composition that has been reduced in viscosity by heating.

A fiber-reinforced composite material can be obtained by laminating and curing the prepreg according to the present embodiment. The fiber-reinforced composite material obtained in this way achieves both thinness and flame retardancy.

(Fiber-Reinforced Composite Material)

The fiber-reinforced composite material according to the present embodiment is obtained by laminating and curing a plurality of prepregs, and at least one of a plurality of prepregs is the prepreg according to the above embodiment. In the present embodiment, half or more of the plurality of prepregs may be the prepreg according to the above embodiment, and all of the plurality of prepregs may be the prepreg according to the above embodiment. For the plurality of prepregs to be laminated and cured, the compositions may be the same or different.

The shape of the fiber-reinforced composite material is not particularly limited, and for example may be plate shape.

The thickness of the fiber-reinforced composite material (thickness in the laminating direction) is not particularly limited, and is preferable to be 1.5 mm or less and more preferable to be 1.0 mm or less, from the viewpoint of achieving both thinness and flame retardancy. The lower limit of the thickness of the fiber-reinforced composite material is not particularly limited, and for example may be 0.2 mm or more and 0.4 mm or more.

The number of laminated prepregs is not particularly limited, and for example may be 2 to 16 and is preferably 4 to 8.

It is preferable for the fiber-reinforced composite material to have a flame retardancy of V-0 or V-1 as evaluated by UL94 burning test, and it is more preferable for that material to have V-0. Such a fiber-reinforced composite material is particularly excellent in flame retardancy.

The manufacturing method of a fiber-reinforced composite material is not particularly limited. For example, the manufacture can be performed by laminating a plurality of prepregs and thermally curing them. The condition of thermal curing is not particularly limited, and may be a condition that the resin composition of the prepreg is cured. In addition, in this manufacturing method, for example, a prepreg laminate is deformed into a predetermined shape during thermal curing, allowing a fiber-reinforced composite material molded into a predetermined shape to be obtained.

The heating temperature during thermal curing may be, for example, 100 to 150° C. or may be 110 to 140° C. In addition, the heating time during thermal curing may be, for example, 10 minutes to 3 hours or may be 20 minutes to 2 hours.

Pressure may be applied during thermal curing, and the pressurizing condition may be, for example, 0.1 to 0.9 MPa.

The fiber-reinforced composite material according to the present embodiment can be suitably used for applications that require both thinness and flame retardancy, such as a housing of electronic and electrical equipment. The fiber-reinforced composite material according to the present embodiment can also be suitably used for applications, for example, structural materials such as aircrafts and automobiles, sports equipment such as golf shafts and fishing rods, and civil engineering materials.

The suitable embodiment of the present invention has been described as above, and the present invention is not limited to the above embodiment.

EXAMPLES

Hereinafter, the present invention will be described in detail by Examples, and the present invention is not limited to these Examples.

Example A-1

40 parts by mass of an epoxy resin having a biphenyl structure (NC-3000, manufactured by Nippon Kayaku Co., Ltd.), 14 parts by mass of a bisphenol A epoxy resin (YD-128, manufactured by Nippon Steel & Sumikin Chemical Co., Ltd.), 20 parts by mass of a phenol novolac epoxy resin (YDPN-638, manufactured by Nippon Steel & Sumikin Chemical Co., Ltd.), 40 parts by mass of melamine cyanurate (MC-6000, manufactured by Nissan Chemical Co., Ltd.), 4 parts by mass of dicyandiamide (DICY), and 3 parts by mass of 3-(3,4-dichlorophenyl)-1,1-dimethylurea (DCMU) were mixed to obtain a resin composition A-1. The viscosity of the obtained resin composition A-1 at 30° C. was 60100 Pa·s. In addition, the glass transition temperature of the resin cured product after curing at 140° C. for 2 hours was 155° C., and a flame retardancy evaluation equivalent to the UL 94 burning test showed that the result was equivalent to V-0.

XN-80 (manufactured by Nippon Graphite Fiber Co., Ltd, and tensile elastic modulus of 780 GPa) was prepared as carbon fibers, and these carbon fibers were impregnated with the resin composition A-1. Thereby, a prepreg (prepreg A-1) with a number of carbon fibers per unit area of 125 g/m² and a resin content of 32% was obtained.

Example A-2

A resin composition A-2 was obtained in the same manner as in Example A-1, except that the loadings of the epoxy resin having a biphenyl structure, the bisphenol An epoxy resin, and the phenol novolac epoxy resin were changed to 35 parts by mass, 19 parts by mass, and 13 parts by mass, respectively. The viscosity of the obtained resin composition A-2 at 30° C. was 22100 Pa·s. In addition, the glass transition temperature of the resin composition after curing at 140° C. for 2 hours was 151° C., and a flame retardancy evaluation equivalent to the UL 94 burning test showed that the result was equivalent to V-0.

A prepreg was produced in the same manner as in Example A-1 except that the resin composition A-2 was used instead of the resin composition A-1, and the prepreg with a number of carbon fibers per unit area of 125 g/m² and a resin content of 32% (prepreg A-2) was obtained.

Example A-3

A resin composition A-3 was obtained in the same manner as in Example A-1, except that the loadings of the epoxy resin having a biphenyl structure, the bisphenol An epoxy resin, and the phenol novolac epoxy resin were changed to 30 parts by mass, 14 parts by mass, and 23 parts by mass and 5 parts by mass of a phenoxy resin (YP-70, manufactured by Nippon Steel & Sumikin Chemical Co., Ltd.) were further mixed. The viscosity of the obtained resin composition A-3 at 30° C. was 113000 Pa·s. In addition, the glass transition temperature after curing at 140° C. for 2 hours was 153° C., and a flame retardancy evaluation equivalent to the UL 94 burning test showed that the result was equivalent to V-0.

A prepreg was produced in the same manner as in Example A-1 except that the resin composition A-3 was used instead of the resin composition A-1, and the prepreg with a number of carbon fibers per unit area of 125 g/m² and a resin content of 32% (prepreg A-3) was obtained.

Example A-4

A resin composition A-4 was obtained in the same manner as in Example A-1, except that the loadings of the epoxy resin having a biphenyl structure, the bisphenol An epoxy resin, and the phenol novolac epoxy resin were changed to 30 parts by mass, 32 parts by mass, and 0 parts by mass and 10 parts by mass of the phenoxy resin (YP-70, manufactured by Nippon Steel & Sumikin Chemical Co., Ltd.) were further mixed. The viscosity of the obtained resin composition A-4 at 30° C. was 35000 Pa·s. In addition, the glass transition temperature of the resin composition after curing at 140° C. for 2 hours was 128° C., and a flame retardancy evaluation equivalent to the UL 94 burning test showed that the result was equivalent to V-0.

A prepreg was produced in the same manner as in Example A-1 except that the resin composition A-4 was used instead of the resin composition A-1, and the prepreg with a number of carbon fibers per unit area of 125 g/m² and a resin content of 32% (prepreg A-4) was obtained.

Example A-5

A prepreg was produced in the same manner as in Example A-2 except that T700S (manufactured by Toray industries, Inc. and tensile elastic modulus of 230 GPa) was used as carbon fibers, and the prepreg with a number of carbon fibers per unit area of 200 g/m² and a resin content of 32% (prepreg A-5) was obtained.

Comparative Example X-1

37 parts by mass of the bisphenol An epoxy resin (YD-128, manufactured by Nippon Steel & Sumikin Chemical Co., Ltd.), 33 parts by mass of the bisphenol An epoxy resin (YD-11, manufactured by Nippon Steel & Sumikin Chemical Co., Ltd.), 30 parts by mass of the phenol novolac epoxy resin (YDPN-638, manufactured by Nippon Steel & Sumikin Chemical Co., Ltd.), 15 parts by mass of the phenoxy resin (YP-70, manufactured by Nippon Steel & Sumikin Chemical Co., Ltd.), 4 parts by mass of dicyandiamide (DICY), and 3 parts by mass of 3-(3,4-dichlorophenyl)-1, 1-dimethylurea (DCMU) were mixed to obtain a resin composition X-1. The viscosity of the obtained resin composition X-1 at 30° C. was 24100 Pa·s. In addition, the glass transition temperature of the resin cured product after curing at 140° C. for 2 hours was 131° C., and a flame retardancy evaluation equivalent to the UL 94 burning test showed that the result was equivalent to V-not.

XN-80 (manufactured by Nippon Graphite Fiber Co., Ltd. and tensile elastic modulus of 780 GPa) was prepared as carbon fibers, and these carbon fibers were impregnated with the resin composition X-1. Thereby, a prepreg (prepreg X-1) with a number of carbon fibers per unit area of 125 g/m² and a resin content of 32% was obtained.

Comparative Example X-2

A resin composition X-2 was obtained in the same manner as in Comparative Example X-1, except that the loading of YD-11 was changed to 13 parts by mass and 20 parts by mass of melamine cyanurate (MC-6000, manufactured by Nissan Chemical Co., Ltd.) was further mixed. The viscosity of the obtained resin composition X-2 at 30° C. was 10600 Pa·s. In addition, the glass transition temperature of the resin cured product after curing at 140° C. for 2 hours was 128° C., and a flame retardancy evaluation equivalent to the UL 94 burning test showed that the result was equivalent to V-2.

Comparative Example X-3

A resin composition X-3 was obtained in the same manner as in Comparative Example X-2, except that the loadings of YP-70 and MC-6000 were changed to 5 parts by mass and 0 parts by mass, respectively, and 30 parts by mass of the epoxy resin having a biphenyl structure (NC-3000, manufactured by Nippon Kayaku Co., Ltd.) was further mixed. The viscosity of the obtained resin composition X-3 at 30° C. was 16600 Pa·s. In addition, the glass transition temperature of the resin cured product after curing at 140° C. for 2 hours was 134° C., and a flame retardancy evaluation equivalent to the UL 94 burning test showed that the result was equivalent to V-not.

Example B-1

Four prepregs A-1 were laminated and cured in an autoclave under the conditions of a pressure of 0.6 MPa and 140° C. for 2 hours to obtain a fiber-reinforced composite material plate with a thickness of 0.57 mm. For the obtained fiber-reinforced composite material plate, the result of a flame retardancy evaluation equivalent to the UL94 burning test was equivalent to V-0.

Example B-2

Four prepregs A-2 were laminated and cured in an autoclave under the conditions of a pressure of 0.6 MPa and 140° C. for 2 hours to obtain a fiber-reinforced composite material plate with a thickness of 0.43 mm. For the obtained fiber-reinforced composite material plate, the result of a flame retardancy evaluation equivalent to the UL94 burning test was equivalent to V-0.

Example B-3

Four prepregs A-3 were laminated and cured in an autoclave under the conditions of a pressure of 0.6 MPa and 140° C. for 2 hours to obtain a fiber-reinforced composite material plate with a thickness of 0.57 mm. For the obtained fiber-reinforced composite material plate, the result of a flame retardancy evaluation equivalent to the UL94 burning test was equivalent to V-0.

Example B-4

Four prepregs A-4 were laminated and cured in an autoclave under the conditions of a pressure of 0.6 MPa and 140° C. for 2 hours to obtain a fiber-reinforced composite material plate with a thickness of 0.57 mm. For the obtained fiber-reinforced composite material plate, the result of a flame retardancy evaluation equivalent to the UL94 burning test was equivalent to V-1.

Example B-5

Four prepregs A-5 were laminated and cured in an autoclave under the conditions of a pressure of 0.6 MPa and 140° C. for 2 hours to obtain a fiber-reinforced composite material plate with a thickness of 0.85 mm. For the obtained fiber-reinforced composite material plate, the result of a flame retardancy evaluation equivalent to the UL94 burning test was equivalent to V-0.

Example B-6

Ten prepregs A-2 were laminated and cured in an autoclave under the conditions of a pressure of 0.6 MPa and 140° C. for 2 hours to obtain a fiber-reinforced composite material plate with a thickness of 1.1 mm. For the obtained fiber-reinforced composite material plate, the result of a flame retardancy evaluation equivalent to the UL94 burning test was equivalent to V-0.

Example B-7

Three prepregs A-5 were laminated and cured in an autoclave under the conditions of a pressure of 0.6 MPa and 140° C. for 2 hours to obtain a fiber-reinforced composite material plate with a thickness of 0.67 mm. For the obtained fiber-reinforced composite material plate, the result of a flame retardancy evaluation equivalent to the UL94 burning test was equivalent to V-1.

Example B-8

Five pieces of prepregs A-2 and prepregs A-5 were laminated in the order of A-2/A-2/A-5/A-2/A-2 and were cured in an autoclave under the conditions of a pressure of 0.6 MPa and 140° C. for 2 hours to obtain a fiber-reinforced composite material plate with a thickness of 0.65 mm. For the obtained fiber-reinforced composite material plate, the result of a flame retardancy evaluation equivalent to the UL94 burning test was equivalent to V-0.

Comparative Example Y-1

16 prepregs X-1 were laminated and cured in an autoclave under the conditions of a pressure of 0.6 MPa and 140° C. for 2 hours to obtain a fiber-reinforced composite material plate with a thickness of 2.4 mm. For the obtained fiber-reinforced composite material plate, the result of a flame retardancy evaluation equivalent to the UL94 burning test was equivalent to V-not.

INDUSTRIAL APPLICABILITY

The prepreg according to the present invention can form a fiber-reinforced composite material that achieves both thinness and flame retardancy without using a halogenated flame retardant and a phosphorus-based flame retardant. Thus, the prepreg according to the present invention can be suitably used for applications such as a housing of electronic and electrical equipment.

The invention claimed is:
1. A prepreg comprising:
   carbon fibers; and
   a resin composition comprising
      an epoxy resin (A) having a biphenyl structure and two or more epoxy groups,
      an epoxy resin (B) having two or more epoxy groups and having no biphenyl structure,
      a curing agent, and
      melamine cyanurate,
   wherein
      a content of chlorine atoms in the resin composition is 1% by mass or less,
      a content of phosphorus atoms in the resin composition is 0.1% by mass or less,
      a content of the epoxy resin (A) with respect to the total amount of the epoxy resin (A) and the epoxy resin (B) is 20% by mass or more and 40% by mass or less,
      the total amount of the epoxy resin (A) and the epoxy resin (B) is 60% by mass or more and 75% by mass or less based on the total amount of the resin composition,
      a content of the melamine cyanurate is 25% by mass or more and 40% by mass or less based on the total amount of the resin composition,
      a content of the carbon fibers in the prepreg is 20% by mass or more and 90% by mass or less, and
      the epoxy resin (A) comprises an epoxy resin represented by the formula (A-1):

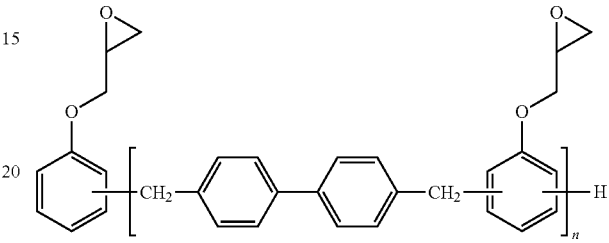

(A-1)

wherein n is an integer of 1 or more.

2. A fiber-reinforced composite material obtained by laminating and curing a plurality of prepregs, wherein at least one of the prepregs is a prepreg according to claim 1.

3. The fiber-reinforced composite material according to claim 2, wherein a thickness in a laminating direction is 1.5 mm or less.

4. The fiber-reinforced composite material according to claim 2, wherein a flame retardancy as evaluated by the UL94 burning test is V-0 or V-1.

5. A molded article comprising the fiber-reinforced composite material according to claim 2.

6. A molded article comprising the fiber-reinforced composite material according to claim 3.

7. A molded article comprising the fiber-reinforced composite material according to claim 4.

* * * * *